(12) United States Patent
Vincent et al.

(10) Patent No.: US 12,462,939 B2
(45) Date of Patent: Nov. 4, 2025

(54) ATLAS-BASED CHARACTERIZATION OF PATENT-SPECIFIC CARDIAC ELECTROMECHANICAL ACTIVATION MAPS

(71) Applicant: The Regents of the University of California, Oakland, CA (US)

(72) Inventors: Kevin Vincent, San Diego, CA (US); Andrew D. McCulloch, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 189 days.

(21) Appl. No.: 18/257,265

(22) PCT Filed: Dec. 22, 2021

(86) PCT No.: PCT/US2021/064992
§ 371 (c)(1),
(2) Date: Jun. 13, 2023

(87) PCT Pub. No.: WO2022/140627
PCT Pub. Date: Jun. 30, 2022

(65) Prior Publication Data
US 2024/0047064 A1 Feb. 8, 2024

Related U.S. Application Data

(60) Provisional application No. 63/129,053, filed on Dec. 22, 2020.

(51) Int. Cl.
*G16H 50/20* (2018.01)
*A61B 5/319* (2021.01)
(Continued)

(52) U.S. Cl.
CPC ............. *G16H 50/20* (2018.01); *A61B 5/319* (2021.01); *A61B 5/341* (2021.01); *A61B 5/367* (2021.01); *G16H 20/40* (2018.01)

(58) Field of Classification Search
None
See application file for complete search history.

(56) References Cited

U.S. PATENT DOCUMENTS

2014/0194758 A1\* 7/2014 Korenberg ........... A61B 5/7253
600/509
2015/0216432 A1\* 8/2015 Yang ..................... A61B 5/341
600/512

(Continued)

OTHER PUBLICATIONS

"A Vectorcardiogram-based Classification System for the Detection of Myocardial Infarction"; Huang et al.; Aug. 30-Sep. 3, 2011; IEEE (Year: 2011).\*

(Continued)

*Primary Examiner* — John A Pauls
(74) *Attorney, Agent, or Firm* — FisherBroyles, LLP

(57) ABSTRACT

A method may include generating, based on a plurality of electrophysiology simulations such as electrical and/or electromechanical activation maps, one or more atlases including an activation time (AT) atlas and a vectorcardiogram (VCG) atlas. The atlases may be generated by applying a dimensionality reduction technique to include one or more modes of variation present in the electrophysiology simulations. The atlases may be applied to match a clinical vectorcardiogram of a patient to a simulated vectorcardiogram associated with an activation map included in the electrophysiology simulations. At least one of a diagnosis or treatment for the patient may be determined based on the activation map. Related systems and computer program products are also provided.

19 Claims, 9 Drawing Sheets

(51) Int. Cl.
    *A61B 5/341*     (2021.01)
    *A61B 5/367*     (2021.01)
    *G16H 20/40*     (2018.01)

(56) References Cited

U.S. PATENT DOCUMENTS

| | | | | |
|---|---|---|---|---|
| 2016/0143553 | A1* | 5/2016 | Chien | A61B 5/746 |
| | | | | 600/512 |
| 2016/0262635 | A1 | 9/2016 | McCullouch et al. | |
| 2019/0120919 | A1 | 4/2019 | Saggar | |
| 2019/0304183 | A1* | 10/2019 | Krummen | A61B 5/6823 |
| 2022/0125365 | A1* | 4/2022 | Aranda Hernandez | |
| | | | | G06F 18/214 |

OTHER PUBLICATIONS

"Vectorcardiographic diagnostic & prognostic information derived from the 12-lead electrocardiogram: Historical review and clinical perspective"; Man et al.; May 2015 (Year: 2015).*

Al-Nashash, H.A.M. "A Dynamic Fourier Series for the Compression of ECG Using FFT and Adaptive Coefficient Estimation." Medical Engineering & Physics 1995;17:197-203.

Bratincsák, A. et al. "Electrocardiogram Standards for Children and Young Adults Using Z-Scores." Circulation: Arrhythmia and Electrophysiology American Heart Association; 2020;13:e008253.

Duchateau, N. et al. "A Spatiotemporal Statistical Atlas of Motion for the Quantification of Abnormal Myocardial Tissue Velocities." Medical Image Analysis 2011;15:316-28.

Gilbert, K. et al. "Artificial Intelligence in Cardiac Imaging with Statistical Atlases of Cardiac Anatomy." Front Cardiovasc Med Frontiers; 2020;7.

Kors, J.A. et al. "Reconstruction of the Frank Vectorcardiogram from Standard Electrocardiographic Leads: Diagnostic Comparison of Different Methods." Eur Heart J 1990;11:1083-92.

Krishnamurthy, A. et al. "Patient-specific Models of Cardiac Biomechanics." Journal of Computational Physics 2013;244:4-21.

Lombaert, H. et al. "Human Atlas of the Cardiac Fiber Architecture: Study on a Healthy Population." IEEE Transactions on Medical Imaging 2012;31:1436-47.

Martis, R.J. et al. "ECG Beat Classification using PCA, LDA, ICA and Discrete Wavelet Transform." Biomedical Signal Processing and Control 2013;8:437-48.

Mauger, C. et al. "Right Ventricular Shape and Function: Cardiovascular Magnetic Resonance Reference Morphology and Biventricular Risk Factor Morphometrics in UK Biobank." Journal of Cardiovascular Magnetic Resonance 2019;21:41.

Niederer, S.A. et al. "Computational Models in Cardiology." Nature Reviews Cardiology Nature Publishing Group; 2019;16:100-11.

Pezzuto, S. et al. "Evaluation of a Rapid Anisotropic Model for ECG Simulation." Front Physiol Frontiers; 2017;8.

Quaglino, A. et al. "Fast Uncertainty Quantification of Activation Sequences In Patient-Specific Cardiac Electrophysiology Meeting Clinical Time Constraints." International Journal for Numerical Methods in Biomedical Engineering 2018;34:e2985.

Sahli Costabal, F. et al. "Multi-fidelity Classification Using Gaussian Processes: Accelerating the prediction of large-scale computational models." Computer Methods in Applied Mechanics and Engineering 2019;357:112602.

Sahli Costabal, F. et al. "Physics-Informed Neural Networks for Cardiac Activation Mapping." Front Phys Frontiers; 2020;8.

Strik, M. et al. "Animal Models of Dyssynchrony." J Cardiovasc Transl Res 2012;5:135-45.

Ten Tusscher, K.H.W.J. et al. "Alternans and Spiral Breakup in a Human Ventricular Tissue Model." Am J Physiol Heart Circ Physiol 2006;291:H1088-1100.

Villongco, C.T. et al. "Non-invasive, Model-Based Measures of Ventricular Electrical Dyssynchrony for Predicting CRT Outcomes." Europace Oxford Academic; 2016;18:iv104-12.

Villongco, C.T. et al. "Patient-specific Modeling of Ventricular Activation Pattern Using Surface ECG-derived Vectorcardiogram in Bundle Branch Block." Prog Biophys Mol Biol 2014;115:305-13.

Vincent, K.P. et al "High-order Finite Element Methods for Cardiac Monodomain Simulations." Front Physiol 2015;6:217.

Wang, Y. et al. "Application of the Method of Fundamental Solutions to Potential-based Inverse Electrocardiography." Ann Biomed Eng 2006;34:1272-88.

* cited by examiner

ATLAS-BASED CHARACTERIZATION OF PATENT-SPECIFIC CARDIAC ELECTROMECHANICAL ACTIVATION MAPS

RELATED APPLICATION

This application is a national stage entry of Patent Cooperation Treaty Application No. PCT/US2021/064992 filed Dec. 22, 2021, entitled "ATLAS-BASED CHARACTERIZATION OF PATENT-SPECIFIC CARDIAC ELECTROMECHANICAL ACTIVATION MAPS," which claims priority to U.S. Provisional Application No. 63/129,053 filed Dec. 22, 2020, entitled "NEW APPROACH TO RAPIDLY GENERATE PATIENT-SPECIFIC ACTIVATION MAPS FROM ELECTROPHYSIOLOGICAL DATA," the disclosures of which are incorporated herein by reference in their entirety.

STATEMENT OF GOVERNMENT SUPPORT

This invention was made with government support under HL121754 and TR001443 awarded by the National Institutes of Health. The government has certain rights in the invention.

TECHNICAL FIELD

The subject matter described herein relates generally to computational data analysis, modeling, and simulations, and more specifically to a dimensionality reduction based technique for generating patient-specific cardiac electrical and/or mechanical activation maps and relating them to non-invasive clinical measurements.

BACKGROUND

Cardiac arrhythmias are common and often life-threatening medical disorders in which the normal sequence of electrical impulse conduction in the heart is disrupted. The resulting irregular heartbeat, or arrhythmia, can occur in the atria of the heart (e.g., atrial fibrillation (AF)) and/or the ventricles of the heart (e.g., bundle branch block (BBB), ventricular tachycardia (VT) or ventricular fibrillation (VF)). Treatments for cardiac arrhythmias attempt to address the mechanisms driving sustained and/or clinically significant episodes including, for example, stable electrical rotors, recurring electrical focal sources, reentrant electrical circuits, and/or other rhythms characterized by abnormal spatiotemporal sequences of electrical activation through the heart wall. Left untreated, cardiac arrhythmias may cause serious health complications such as morbidity (e.g., syncope, stroke, and/or the like) and mortality (e.g. sudden cardiac death (SCD)). Sudden cardiac death (SCD) affects approximately 400,000 patients in the United States and 3,000,000 patients worldwide every year.

SUMMARY

Systems, methods, and articles of manufacture, including computer program products, are provided for atlas-based characterization of patient-specific cardiac electrical or electromechanical activation maps. In one aspect, there is provided a system for efficient non-invasive arrhythmia source localization. The system may include at least one processor and at least one memory storing instructions that cause operations when executed by the at least one processor. The operations may include: deriving from cardiac mapping measurements or three-dimensional anatomically detailed simulations an atlas of activation modes representing the components of electrical activation time maps that represent the major sources of variation between individuals within a population or patient cohort; using a subset of these modes that together describe a large fraction of the total variation to reconstruct individual activation patterns whether from simulation or measurement and using these reconstructed activation patterns to compute the QRS complex of the body surface electrogram without recomputing the individual patient simulation; matching body surface electrograms generated from patterns of three-dimensional cardiac activation to clinical recordings; using the match to identify individual patient activation modes; reconstructing the patient-specific activation pattern from the modes; applying this approach to mechanical activation patterns using simulations of cardiac electromechanics or regional strain measurements from cardiac imaging techniques such as tagged magnetic resonance imaging (MRI).

In some variations, one or more features disclosed herein including the following features can optionally be included in any feasible combination. The operations may include: generating, based at least on a plurality of electrophysiology simulations, one or more atlases including one or more modes of variation present in the plurality of electrophysiology simulations; applying the one or more atlases to match a clinical vectorcardiogram of a patient to a simulated vectorcardiogram associated with an activation map included in the plurality of electrophysiology simulations; and determining, based at least on the activation map at least one of a diagnosis or treatment for the patient.

In some variations, the one or more atlases may include an activation time atlas and a vectorcardiogram atlas.

In some variations, the one or more atlases may be generated by applying a dimensionality reduction technique.

In some variations, the dimensionality reduction technique may include one or more of principal component analysis (PCA), random projection, robust principal component analysis (RPCA), t-distributed stochastic neighbor embedding (t-SNE), a uniform manifold approximation and projection (UMAP), Fourier series, and linear discriminant analysis.

In some variations, the one or more modes of variation may include a first mode and a second mode. The first mode may be associated with a first quantity of variations that is greater than a second quantity of variations associated with the second mode.

In some variations, the one or more modes of variation may further include a third mode associated with a third quantity of variations. The second quantity of variations associated with the second mode may be greater than the third quantity of variations associated with the third mode.

In some variations, the one or more modes of variation may include a first mode associated with variations between an early activation on an anterior wall of a heart and a posterior wall of the heart, a second mode associated with variations in an apical/basal direction of the heart, and a third mode associated with variations in a right ventricle and left ventricle of the heart.

In some variations, the diagnosis may include identifying a location of a source of a cardiac arrhythmia associated with the patient.

In some variations, the treatment may include identification of a target for catheter ablation and/or a stereotactic ablative radiotherapy (SAbR).

In some variations, the plurality of electrophysiology simulations may include one or more electrical activation maps, biomechanical activation maps, and/or electromechanical activation maps with diagnostic utility in identifying regions of abnormal cardiac function.

In some variations, the one or more atlases may be applied to generate a reduced dimension representation of the clinical vectorcardiogram. The reduced dimension representation of the clinical vectorcardiogram may be compared to a plurality of reduced dimension representations of simulated vectorcardiograms to match the clinical vectorcardiogram of the patient to the simulated vectorcardiogram associated with the activation map.

In some variations, the operations may further include: generating the plurality of electrophysiological simulations to correspond to a variety of cardiac geometries, cardiac orientations, scar configurations, degrees of cardiac fibrosis and scar, depolarization patterns, and/or activation types.

In some variations, the operations may further include: generating, for each electrophysiological simulation included in the plurality of electrophysiological simulations, one or more corresponding simulated vectorcardiograms.

In some variations, the clinical vectorcardiogram may be generated by applying a transformation to convert an output of a 12-lead electrocardiogram (ECG).

In some variations, each of the one or more atlases may include between 4 to 100 modes of variation.

In some variations, each of the one or more atlases may include 10-20 modes of variation sufficient to explain over 90% of observed or simulated variation.

In some variations, an error between the clinical vectorcardiogram and a reconstruction of the clinical vectorcardiogram generated based on the one or more atlases may be below a threshold value.

In some variations, the error may correspond to a quantity of modes included in the one or more atlases.

In some variations, the operations may further include: applying the one or more atlases to reconstruct one or more electrical and mechanical activation patterns associated with the patient.

In some variations, the operations may further include: generating, based at least on the reconstructed activation pattern, one or more electrocardiograms (ECG) or vectorcardiograms for the patient making use of an ionic model without requiring additional electrophysiology solutions.

In some variations, the operations may further include: identifying an activation pattern present in a clinical electrocardiographic recording of the patient, the activation pattern identified based on a plurality of relationships between one or more electrocardiograms, vectorcardiograms, and the one or more modes of variation.

In some variations, the one or more atlases may include an atlas of wall mechanics and/or an atlas of electromechanical activation times generated based on one or more measurements and/or simulations of cardiac wall mechanics comprising at least one of stress, strain, shortening, regional work, or timing variables.

In some variations, the operations may further include: reconstructing, based at least on a simulation-derived electromechanical atlas and a relationship between the electromechanical atlas to measurable clinical quantities, a patient-specific biomechanical atlas and/or electromechanical atlas for diagnosing regional disorders in wall mechanics.

In another aspect, there is provided a method for atlas-based characterization of patient-specific cardiac electrical or electromechanical activation maps. The method may include: generating, based at least on a plurality of electrophysiology simulations, one or more atlases including one or more modes of variation present in the plurality of electrophysiology simulations; applying the one or more atlases to match a clinical vectorcardiogram of a patient to a simulated vectorcardiogram associated with an activation map included in the plurality of electrophysiology simulations; and determining, based at least on the activation map at least one of a diagnosis or treatment for the patient.

In some variations, one or more features disclosed herein including the following features can optionally be included in any feasible combination. The one or more atlases may include an activation time atlas and a vectorcardiogram atlas.

In some variations, the one or more atlases may be generated by applying a dimensionality reduction technique.

In some variations, the dimensionality reduction technique may include one or more of principal component analysis (PCA), random projection, robust principal component analysis (RPCA), t-distributed stochastic neighbor embedding (t-SNE), a uniform manifold approximation and projection (UMAP), Fourier series, and linear discriminant analysis.

In some variations, the one or more modes of variation may include a first mode and a second mode. The first mode may be associated with a first quantity of variations that is greater than a second quantity of variations associated with the second mode.

In some variations, the one or more modes of variation may further include a third mode associated with a third quantity of variations. The second quantity of variations associated with the second mode may be greater than the third quantity of variations associated with the third mode.

In some variations, the one or more modes of variation may include a first mode associated with variations between an early activation on an anterior wall of a heart and a posterior wall of the heart, a second mode associated with variations in an apical/basal direction of the heart, and a third mode associated with variations in a right ventricle and left ventricle of the heart.

In some variations, the diagnosis may include identifying a location of a source of a cardiac arrhythmia associated with the patient.

In some variations, the treatment may include a catheter ablation and/or a stereotactic ablative radiotherapy (SAbR).

In some variations, the plurality of electrophysiology simulations may include one or more electrical activation maps, biomechanical activation maps, and/or electromechanical activation maps.

In some variations, the one or more atlases may be applied to generate a reduced dimension representation of the clinical vectorcardiogram. The reduced dimension representation of the clinical vectorcardiogram may be compared to a plurality of reduced dimension representations of simulated vectorcardiograms to match the clinical vectorcardiogram of the patient to the simulated vectorcardiogram associated with the activation map.

In some variations, the method may further include: generating the plurality of electrophysiological simulations to correspond to a variety of cardiac geometries, cardiac orientations, scar configurations, degrees of cardiac fibrosis and scar, depolarization patterns, and/or activation types.

In some variations, the method may further include: generating, for each electrophysiological simulation included in the plurality of electrophysiological simulations, one or more corresponding simulated vectorcardiograms.

In some variations, the clinical vectorcardiogram may be generated by applying a transformation to convert an output of a 12-lead electrocardiogram (ECG).

In some variations, each of the one or more atlases may include between 4 to 100 or more modes of variation.

In some variations, each of the one or more atlases may include a sufficient quantity of modes to cover a threshold quantity of variations present in the plurality of electrophysiological simulations.

In some variations, an error between the clinical vectorcardiogram and a reconstruction of the clinical vectorcardiogram generated based on the one or more atlases may be below a threshold value.

In some variations, the error may correspond to a quantity of modes included in the one or more atlases.

In some variations, the method may further include: applying the one or more atlases to reconstruct an activation pattern associated with the patient.

In some variations, the method may further include: generating, based at least on the reconstructed activation pattern, one or more electrocardiograms (ECG) or vectorcardiograms for the patient without performing additional electrophysiology simulations.

In some variations, the method may further include: identifying an activation pattern present in a clinical electrocardiographic recording of the patient, the activation pattern identified based on a plurality of relationships between one or more electrocardiograms, vectorcardiograms, and the one or more modes of variation.

In some variations, the one or more atlases may include an atlas of wall mechanics and/or an atlas of electromechanical activation times generated based on one or more measurements and/or simulations of cardiac wall mechanics comprising at least one of stress, strain, shortening, work, or timing variables.

In some variations, the method may further include: reconstructing, based at least on a simulation-derived electromechanical atlas and a relationship between the electromechanical atlas to measurable clinical quantities, a patient-specific biomechanical atlas and/or electromechanical atlas for diagnosing regional disorders in wall mechanics.

In another aspect, there is provided a non-transitory computer readable medium storing instructions that cause operations when executed by at least one data processor. The operations may include: generating, based at least on a plurality of electrophysiology simulations, one or more atlases including one or more modes of variation present in the plurality of electrophysiology simulations; applying the one or more atlases to match a clinical vectorcardiogram of a patient to a simulated vectorcardiogram associated with an activation map included in the plurality of electrophysiology simulations; and determining, based at least on the activation map at least one of a diagnosis or treatment for the patient.

Implementations of the current subject matter can include systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connection including, for example, a connection over a network (e.g. the Internet, a wireless wide area network, a local area network, a wide area network, a wired network, or the like), a direct connection between one or more of the multiple computing systems, and/or the like.

The details of one or more variations of the subject matter described herein are set forth in the accompanying drawings and the description below. Other features and advantages of the subject matter described herein may be apparent from the description and drawings, and from the claims. While certain features of the currently disclosed subject matter are described for illustrative purposes in relation to cardiac arrhythmias, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
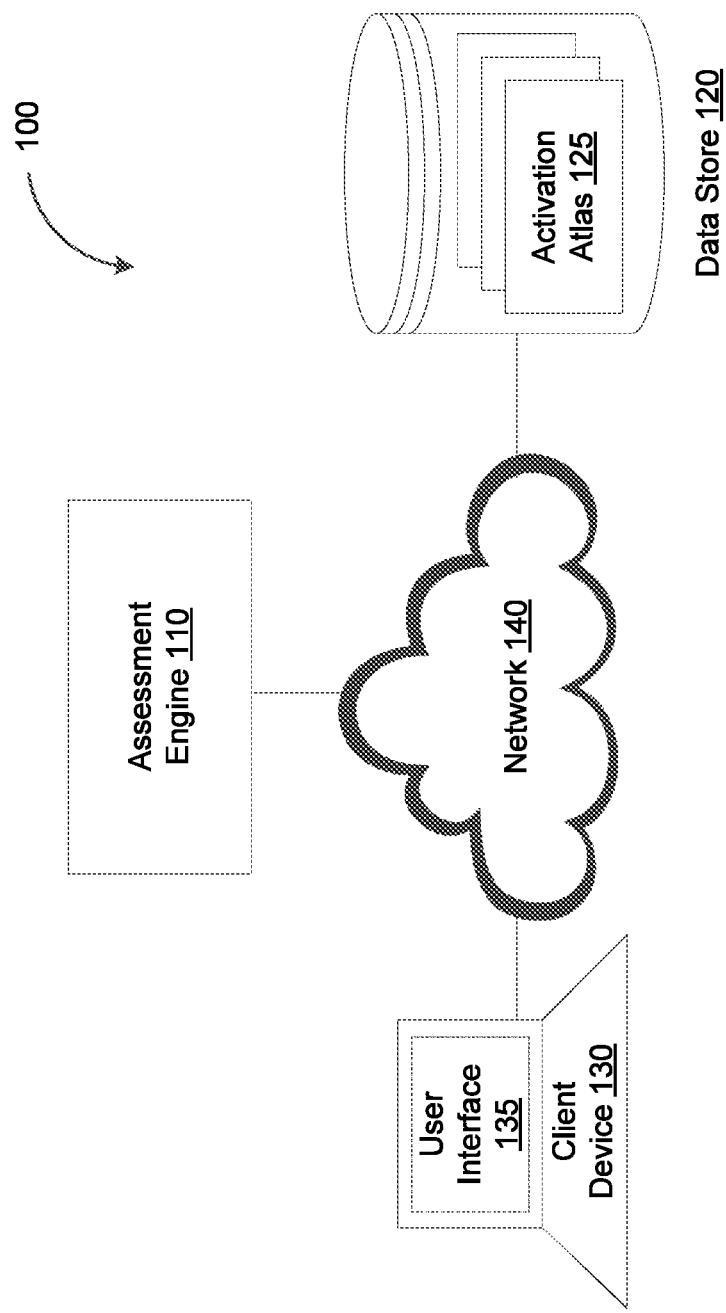
FIG. 1 depicts a system diagram illustrating an example of a activation mapping system, in accordance with some example embodiments.

Cardiac arrhythmias (e.g., atrial fibrillation, ventricular tachycardia, ventricular fibrillation) may be treated by targeting the mechanisms driving sustained and/or clinically significant episodes including, for example, stable electrical rotors, recurring electrical focal sources, reentrant electrical circuits, and/or the like. Ablation is one example treatment for cardiac arrhythmias in which lesions are created at the source of the cardiac arrhythmia (e.g., through the application radiofrequency, cryogenic temperatures, ultrasound, and/or radiation) to disrupt and/or eliminate the erratic electric signals causing the abnormal heart activation.

The diagnosis and treatment of arrhythmias and other cardiac conditions may depend on patient-specific computational models of cardiac electrophysiology and biomechanics. These models may integrate structural and functional clinical measurements into modeling frameworks of cardiac electrical propagation and/or mechanical contraction. For example, an accurate patient-specific electrical and/or mechanical activation map may be essential to modeling the electromechanical dynamics of the patient's heart. However, acquiring patient-specific activation maps generally entail invasive procedures, such as catheter-based electroanatomic endocardial mapping, whereas existing non-invasive methodologies tend to be less precise or computationally expensive. For example, one non-invasive technique that includes matching simulated and clinical vectorcardiogram (VCG) waveforms requires executing numerous computationally expensive finite element simulations to identify the early pacing sites and conductivity properties needed for an optimal match.

As such, in some example embodiments, one or more atlases may be generated based on activation times (AT) and vectorcardiogram (VCG) waveforms derived from a training set of cardiac electrophysiological and/or biomechanical simulations. For example, the one or more atlases may be generated by applying a dimensionality reduction technique such as principal component analysis (PCA), latent variable models, random projection, robust principal component analysis (RPCA), t-distributed stochastic neighbor embedding (t-SNE), a uniform manifold approximation and projection (UMAP), Fourier series, linear discriminant analysis, and/or the like. The application of the dimensionality reduction technique may identify one or more major components of variation, called "modes," that are present in the training set of cardiac electrophysiological and/or biomechanical simulations and of which a subset can explain a large fraction of all the variation across the training set thereby resulting in effective dimensionality reduction.

In some example embodiments, atlases may be used to reconstruct clinical and simulated data across a gamut of population variations. Moreover, these atlases may provide novel metrics for identifying abnormal or pathological features present in clinical data, thus enabling an understanding disease processes and clinical decision making. For example, vectorcardiograms (VCG) may be reconstructed with high fidelity using activation patterns reconstructed from an activation time (AT) atlas while patient vectorcardiograms can be accurately resolved into model-derived vectorcardiogram (VCG) atlas modes. Atlas-based dimensionality reduction may also enable an efficient identification of activation times (e.g., biventricular activation times) from noninvasive surface electrocardiograms and anatomical scans without a need for additional computationally expensive monodomain simulations.

FIG. 1 depicts a system diagram illustrating an example of an electromechanical analysis system 100, in accordance with some example embodiments. Referring to FIG. 1, the electromechanical analysis system 100 may include an assessment engine 110, a data store 120 storing one or more activation atlases 125, and a client device 130. As shown in FIG. 1, the assessment engine 110, the data store 120, and the client device 130 may be communicatively coupled via a network 140. The data store 120 may be a database including, for example, a graph database, an in-memory database, a relational database, a non-SQL (NoSQL) database, and/or the like. The client device 130 may be a processor-based device including, for example, a cellular phone, a smartphone, a tablet computer, a laptop computer, a desktop, a workstation, and/or the like. The network 140 may be a wired network and/or a wireless network including, for example, a wide area network (WAN), a local area network (LAN), a virtual local area network (VLAN), a public land mobile network (PLMN), the Internet, and/or the like.

As noted, the diagnosis and treatment of cardiac conditions such as arrhythmias may depend on patient-specific computational models of cardiac electrophysiology, biomechanics, and electromechanics. For example, an accurate patient-specific electrical and/or biomechanical activation map may be essential to modeling the electromechanical dynamics or synchrony of the patient's cardiac activity. However, instead of acquiring patient-specific activation maps through an invasive procedure such as catheter-based electroanatomic endocardial mapping, one or more simulated cardiac activation maps for the patient may be obtained by matching the patient's vectorcardiogram (VCG) to a simulated vectorcardiogram corresponding to the one or more simulated cardiac activation maps.

Figure 2:
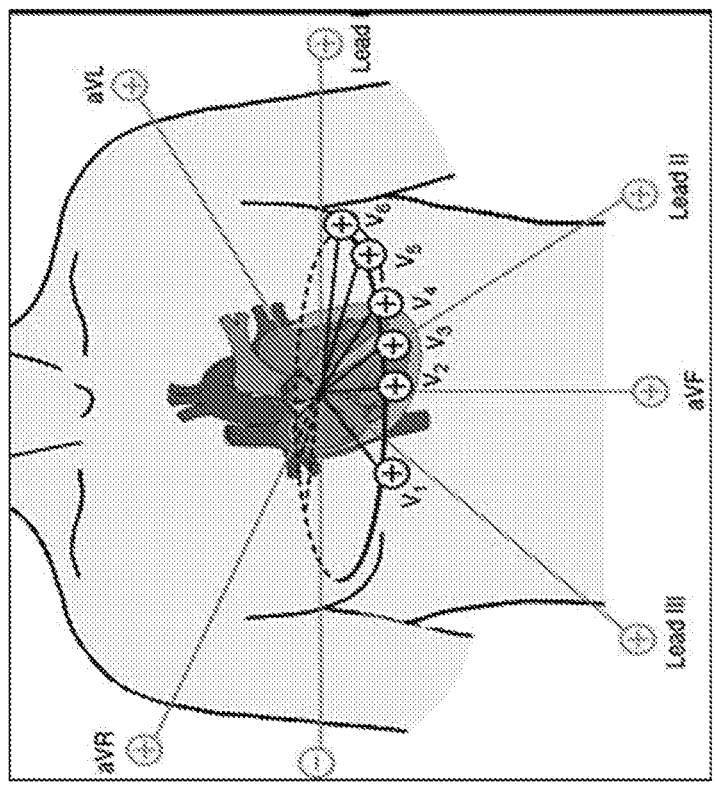
FIG. 2 depicts an example of a non-invasive 12-lead electrocardiogram (ECG) and supplemental body-surface electrograms for computing the spatial activation time pattern and risk of cardiac arrhythmias, in accordance with some example embodiments.

The patient's vectorcardiogram (VCG) may be generated based on the output of a standard 12-lead electrocardiogram (ECG). For example, FIG. 2 depicts a 12-lead electrocardiogram (ECG) with optional supplemental electrogram recordings, which may be distributed around the torso, abdomen, neck, arms, and legs. The output of the 12-lead electrocardiogram (ECG) with a 1-kilohertz sampling rate, for example, may be converted to a vectorcardiogram (VCG) by applying a transformation such as a Kors quasi-orthogonal transformation, an inverse Dower transformation, a Kors regression transformation, and a linear regression-based transformation, or the like.

In some example embodiments, a match between the patient's vectorcardiogram (VCG) and a simulated vectorcardiogram corresponding to the one or more simulated cardiac activation maps, such as simulated electrical and/or mechanical activation maps, may be determined based on one or more atlases. For example, the assessment engine 110 may generate, based on activation times (AT) and vectorcardiogram (VCG) waveforms derived from a training set of cardiac electrophysiological and/or biomechanical simulations, one or more atlases containing one or more modes (or components) that capture the variations present in the cardiac electrophysiological and/or biomechanical simulations in the training set. The assessment engine 110 may generate the one or more atlases by applying a dimensionality reduction technique such as, for example, principal component analysis (PCA), latent variable models, random projection, robust principal component analysis (RPCA), t-distributed stochastic neighbor embedding (t-SNE), a uniform manifold approximation and projection (UMAP), Fourier series, linear discriminant analysis, and/or the like.

Simulated cardiac activation maps, such as simulated electrical and/or mechanical activation maps, may be generated in a variety ways. To generate electrophysiology models and simulations, for example, one or more geometric models of the myocardium, high resolution, biventricular, and patient-specific computational meshes may be generated using one or more medical imaging modalities such as magnetic resonance imaging (MRI), computed tomography (CT), cardiac perfusion scanning, and positron emission tomography (PET). Cardiac fiber architecture may be incorporated using large deformation diffeomorphic mapping of an ex-vivo diffusion tensor magnetic resonance imaging (MRI) data set collected from a cadaver heart. Electrical propagation may be simulated by solving the monodomain equation with a Galerkin finite element solver with finitre element interpolation functions. Action potentials may be modeled using a cardiac myocyte ionic model such as the ten Tusscher human ventricular myocyte model. Conductivity in the myocardium may be modeled as transversely isotropic or orthotropic with the highest conductivity along the primary fiber direction and an anisotropy ratio of 2 to 7 for the transverse direction. Myocardial infarct may be simulated by reducing the conductivity to $\frac{1}{10}^{th}$ or another fraction of the value for healthy myocardium.

The electrophysiology simulations may include ectopic stimulation on the right ventricular (RV) free wall (FW) endocardium to approximate electrical activation during left bundle branch block (LBBB). This may be a common experimental and computational model of left bundle branch block (LBBB) and dyssynchrony. Each patient models may include 181 different stimulus locations on the right ventricle (RV) resulting in a total of 1,448 simulations. The activation maps and simulated vectorcardiograms (VCG) may be derived from the voltage solution for each simulation. For example, a simulated vectorcardiogram (VCG) may be determined by applying Equation (1) below.

$$\varphi_H = -\int_\Omega \sigma_i \nabla V_t d\Omega \quad (1)$$

wherein $\sigma_i$ denotes the transversely isotropic intracellular conductivity, $\varphi_t$ denotes the transmembrane potential difference at time t, and $\Omega$ denotes the domain consisting geometric model of the ventricular myocardium.

The simulations and analysis may be performed in a model-centric frame of reference. The origin of this reference frame is a point in the center of the left ventricular cavity at the midpoint between the base and apex. The x-axis aligned with the long axis of the heart with the positive direction towards the apex of the left ventricle (LV). The y-axis bisects the right ventricular free wall with positive direction towards the right ventricle (RV). The z-axis is positive towards the posterior left ventricle (LV). Clinical vectorcardiogram (VCG) data was rotated from the transformation reference frame (e.g., Kors reference frame) into this model-centric reference frame based on heart position in imaging data.

Activation maps and vectorcardiograms (VCG) may be normalized using the total activation time of non-infarcted myocardium to represent the percentage of the QRS interval duration. Activation times may scale linearly with conductivity with minimal loss in activation pattern. Similar to normalizing geometric measurement to patient height, normalization of the activation maps and vectorcardiograms (VCG) may remove a well known and well quantified feature from the data prior to dimensionality reduction.

Two functions may be used to quantify the differences between vectorcardiograms (VCG) such as a patient's clinical vectorcardiogram and the simulated vectorcardiogram of a simulated cardiac activation map. Equation (2) below is a root-mean-square (RMS) error comparing the sum of the squared differences between each of the three orthogonal vectorcardiogram (VCG) leads either individually or as a sum of all three.

$$\text{RMS Error} = \sum_{i=(x,y,z)} \sqrt{\frac{\sum_{t=1}^{t_{tot}} (\tilde{v}_{i,t}^1 - \tilde{v}_{i,t}^2)^2}{t_{tot}}} \quad (2)$$

wherein $\tilde{v}_{i,t}^1$ and $\tilde{v}_{i,t}^2$ denote the x, y, and z components of the vectorcardiogram (VCG) waveforms being compared.

Equation (3) below is the other objective function, $\theta$, which compares the orientations of two cardiac dipoles:

$$\theta = \frac{1}{t_{tot}} \sum_{t=1}^{t_{tot}} \frac{|\tilde{v}_t^1|}{|\tilde{v}_R^1|} \left( \frac{\acos\left(\frac{\tilde{v}_t^2 \cdot \tilde{v}_t^1}{|\tilde{v}_t^2||\tilde{v}_t^1|\pi}\right)}{\pi} \right) \quad (3)$$

where $\tilde{v}_t^1$ and $\tilde{v}_t^2$ are the two heart vectors being compared at time t, $\tilde{v}_R^1$ denotes the reference heart vector at the peak of the R wave. When comparing the waveforms of simulation derived-vectorcardiograms to clinical vectorcardiograms, the magnitude may be normalized to the peak of the R wave for both vectorcardiograms.

In some example embodiments, the assessment engine 110 may apply a dimensionality reduction technique in order to generate a reduced dimension representation of activation times (AT) and vectorcardiograms (VCG) that include one or more modes of variation. As such, a comparison between a clinical vectorcardiogram and a simulated vectorcardiogram may be performed on the respective reduced dimension representations. One example dimensionality reduction technique is principal component analysis (PCA). Input vectors to the principal component analysis (PCA) framework may include nodal values of activation time (10,705 features) or concatenated vectors of the three vectorcardiogram (VCG) leads (300 features) for the activation atlas and vectorcardiogram atlas, respectively, derived from the 1,448 electrophysiology simulations. Principal components may be computed using singular value decomposition, which may produce a ranked list of orthogonal modes that describe the variation in nodal activation times or vectorcardiogram (VCG) waveforms across the electrophysiology simulations while accounting for correlations between the original features in the data. In each atlas, the first mode may account for the most variance, the second mode may account for the next most variance, and so on. The results of principal component analysis (PCA) may therefore allow the complex features of the activation maps to be represented by a condensed set of measures, or scores, that can provide insights into the distribution of ventricular activation patterns in the population and allow subject specific patterns to be reconstructed from a comparatively small number of modes in very low computational times suitable for clinical application at the bedside.

A sensitivity analysis may be performed in order to quantify the interdependency between two atlases and provide further insight into the outcome of dimensionality reduction. For example, the covariation of the two atlases may be quantified with a compact Jacobian matrix generated by systematically varying modes of the activation time (AT) atlas about its mean and quantifying the change in the vectorcardiogram (VCG) modes. Specifically, activation maps may be determined for the 35th and 65th percentile of each of the first ten activation time (AT) atlas modes. The recalculated VCG corresponding to each of those activation maps may be resolved against the vectorcardiogram (VCG)

atlas. The resulting differences in the first ten vectorcardiogram (VCG) atlas modes were quantified in accordance with Equation (4) below.

$$J_{i,j} = \frac{\partial VCGmode_j}{\partial ATmode_i} = \frac{\text{abs}(VCGmode_{j,65\%} - VCGmode_{j,35\%})}{ATmode_{j,65\%} - ATmode_{j,35\%}} \quad (4)$$

wherein the first ten modes of the activation time (AT) atlas (ATmode$_i$) and the vectorcardiogram (VCG) atlas (VCGmode$_j$) are considered to calculate Jacobian J. This may then allow activation patterns to be reconstructed directly from electrocardiogram modes.

Figure 3:
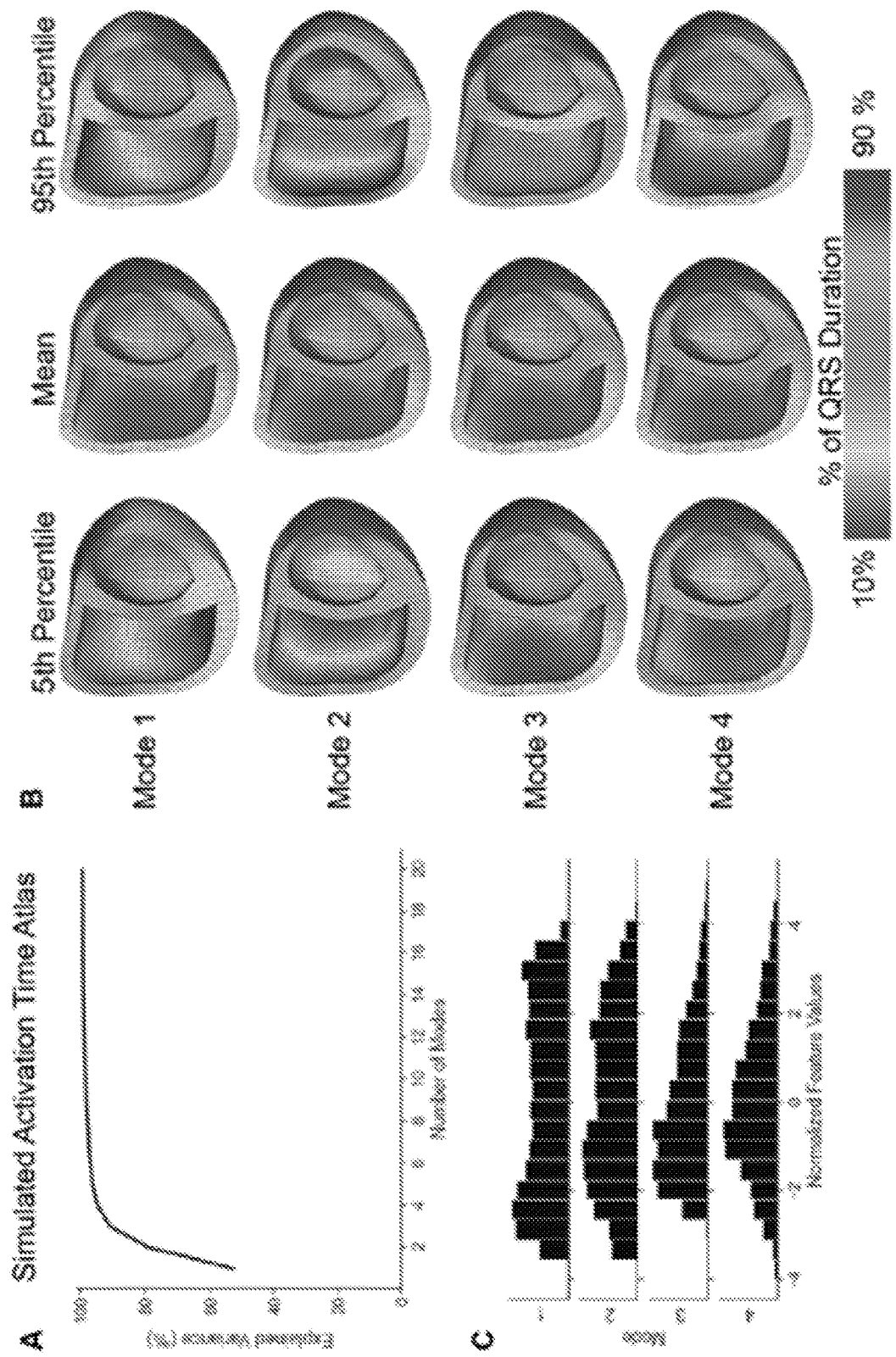
FIG. 3 depicts an example of some modes of a simulated activation time (AT) atlas, in accordance with some example embodiments.

As noted, activation maps from 1,448 cardiac electrophysiology simulations of ectopic pacing on the right ventricle (RV) free wall (FW) were used to generate an activation time (AT) atlas. FIG. 3A shows that the first five principal modes of variation in the resulting activation time (AT) atlas describe 52.6%, 25.9%, 12.1%, 4.0%, and 1.4%, of the variations present in the underlying activation maps respectively. The first four modes combine to describe approximate 90% of the variations present within the underlying activation maps. The top 10 modes of the activation time (AT) atlas describe a cumulative 98.2% of the variation in the underlying activation maps. Activation maps rendered on a bi-ventricular cardiac geometry comparing the atlas mean to the 5th and 95th percentile of the first four modes are shown in FIG. 3B. Histograms of feature values in principal component space for the first four modes, which are shown in FIG. 3C, reveal that the first three modes of variation are not normally distributed. Due to the lack of normality, graphical representations and additional analysis were performed mode percentiles rather than standardized mode z-scores.

Figure 4:
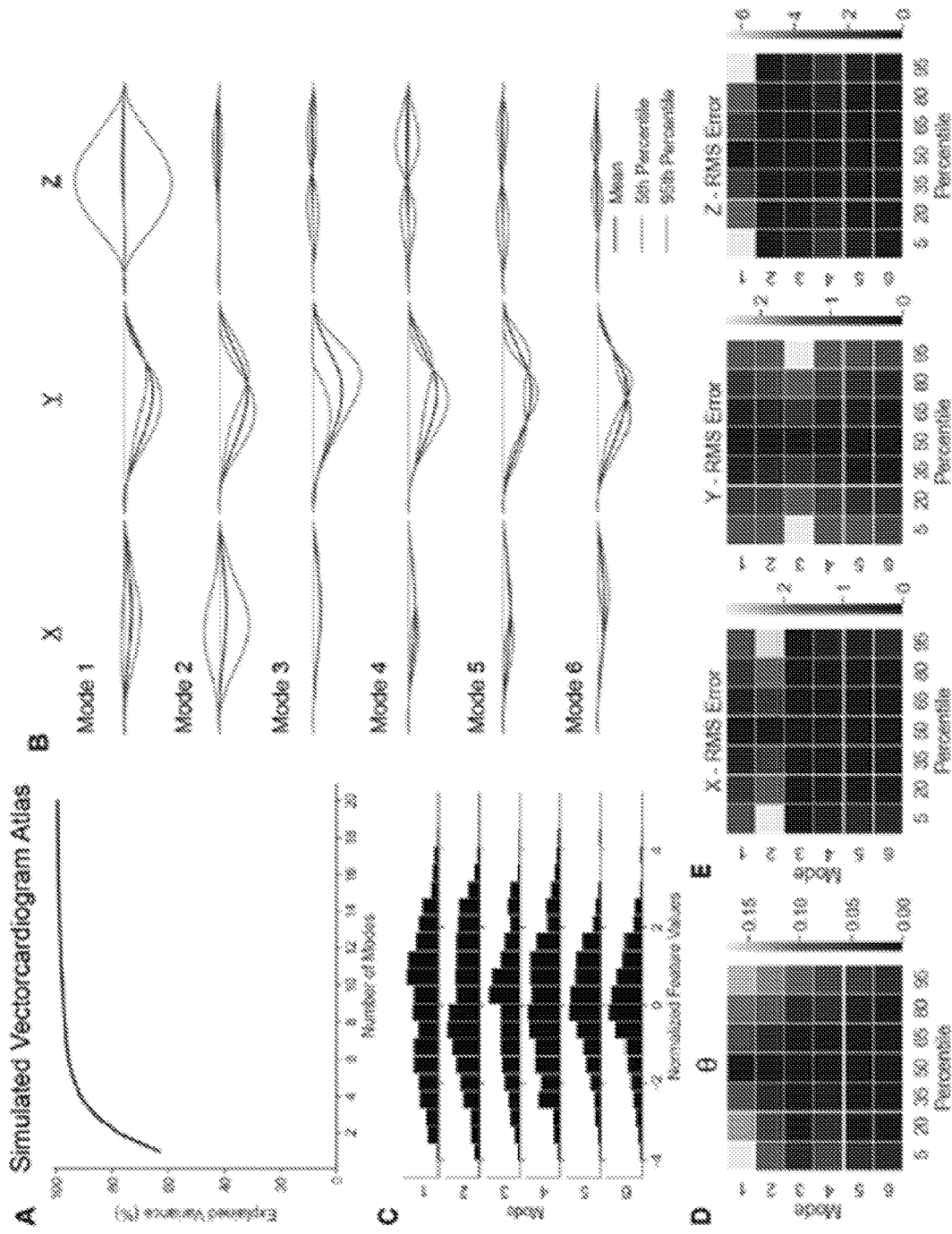
FIG. 4 depicts an example of a simulated vectorcardiogram (VCG) atlas, in accordance with some example embodiments.

As noted, simulated vectorcardiograms (VCGs) derived from the same 1,448 simulations as the activation time (AT) atlas were also used to create a vectorcardiogram (VCG) atlas. FIG. 4A shows that the first five principal modes of variation in the vectorcardiogram (VCG) atlas describe 63.2%, 14.3%, 8.6%, 5.2%, and 2.5%, respectively of the variations present in the underlying vectorcardiograms (VCGs). The top 10 modes of the atlas describe a cumulative 97.7% of the variation in the underlying vectorcardiograms. Vectorcardiograms representing the 5$^{th}$ and 95$^{th}$ percentile of the first six modes are compared to the atlas mean shown in FIG. 4B. Histograms of the feature values in principal component space, which is shown in FIG. 4C, show a different distribution from those in the activation time (AT) atlas. FIG. 2D quantifies the difference in vector orientation between the mean vectorcardiogram (VCG) of the atlas and a span of percentiles for the first six modes using the θ difference function. A root-mean-square (RMS) error analysis on the vectorcardiogram (VCG) components, which is shown in FIG. 4E, demonstrates that Mode 1 is responsible primarily for variation in the z-axis component of the heart vector, Mode 2 is primarily responsible for variation in the x-axis component of the heart vector, and Mode 3 is primarily responsible for variation in the y-axis of the heart vector.

Figure 5:
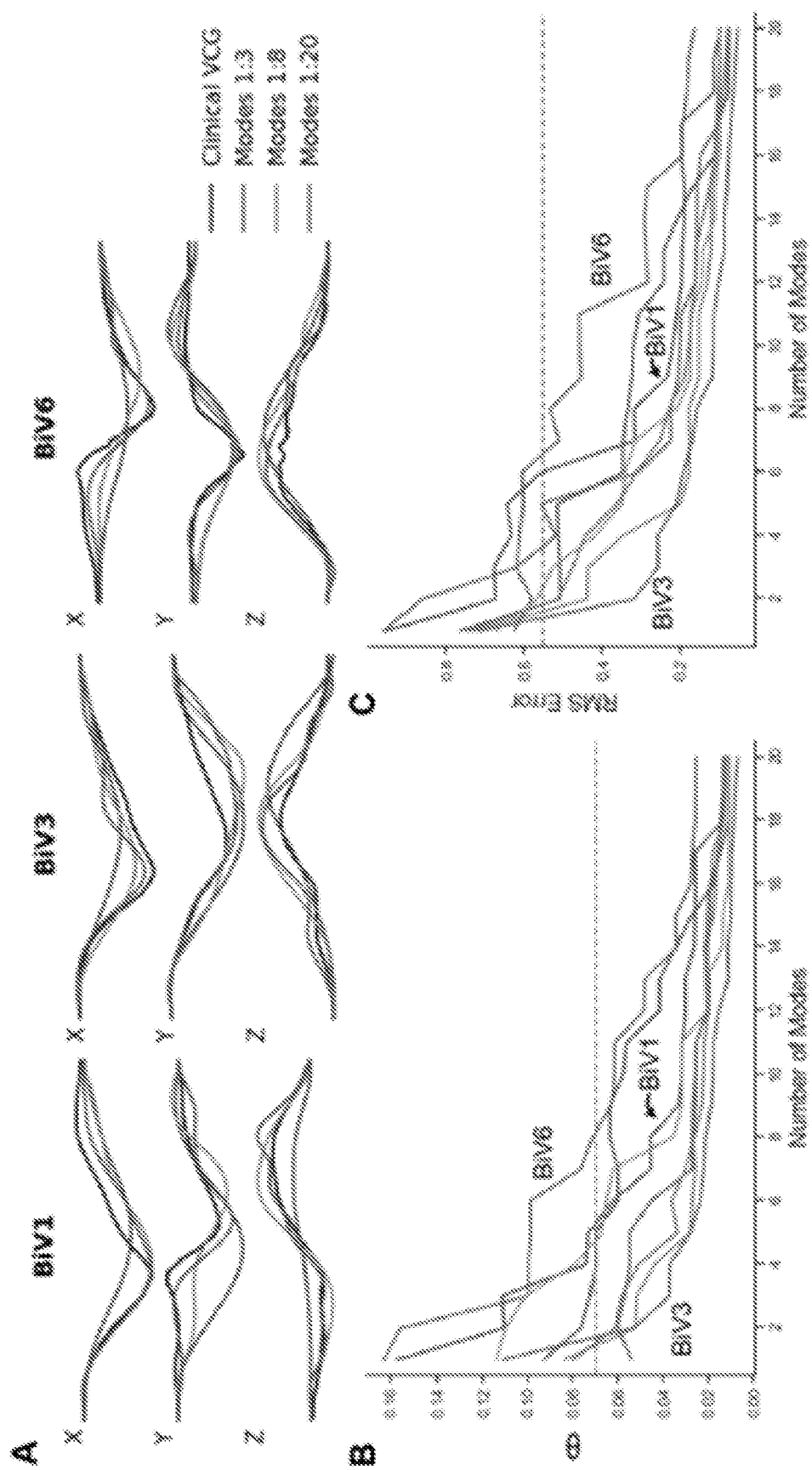
FIG. 5 depicts an example of some modes of variation a vectorcardiogram (VCG) atlas used for reconstruction of clinical vectorcardiograms, in accordance with some example embodiments.
Figure 7:
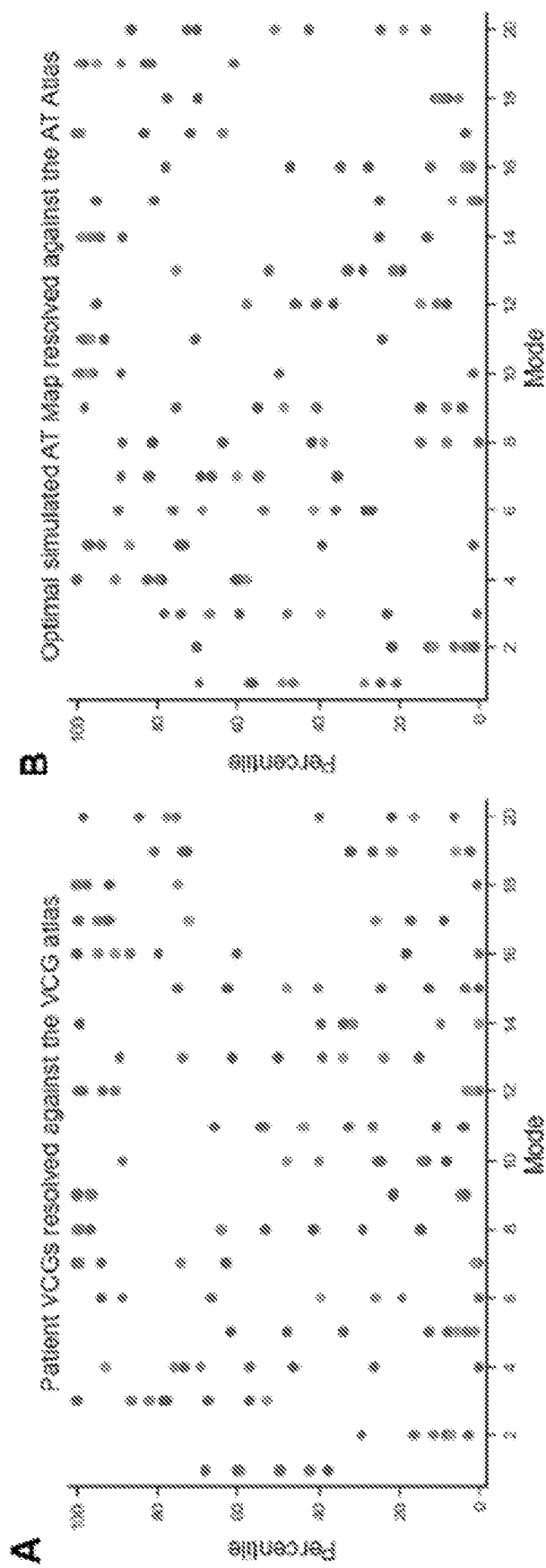
FIG. 7 depicts graph illustrating a utility of simulation-derived atlases for efficiently and accurately reconstructing clinical measurements, in accordance with some example embodiments.

To assess the utility of the vectorcardiogram (VCG) atlas for dimensionality reduction with clinical data, eight patient vectorcardiograms (VCGs) were resolved against the vectorcardiogram atlas as shown in FIG. 7A. The patient vectorcardiograms was then reconstructed using a cumulative number of atlas modes. Three examples are provided in FIG. 5A. As shown in FIG. 5B, the error between the original clinical vectorcardiograms and the reconstructed vectorcardiograms was calculated using the θ difference function while FIG. 5C shows the error being calculated as a root-mean-square (RMS) function. The reconstructed vectorcardiograms shown in FIG. 5 are generated using 3 to 20 modes of variations. The electrophysiology simulations comprising the atlases were originally computed to find optimal matches between simulated and clinical vectorcardiograms (VCGs) for each of the patients. In FIGS. 5B and 5B, the dashed horizontal reference lines (θ=0.07 radians, RMS error=0.55 mV) represent the mean difference between the clinical vectorcardiogram and the optimal simulated vectorcardiogram for the 8 patients studied. Reconstruction of the vectorcardiogram falls below this error value when approximately 8 modes are used in the reconstruction.

Figure 6:
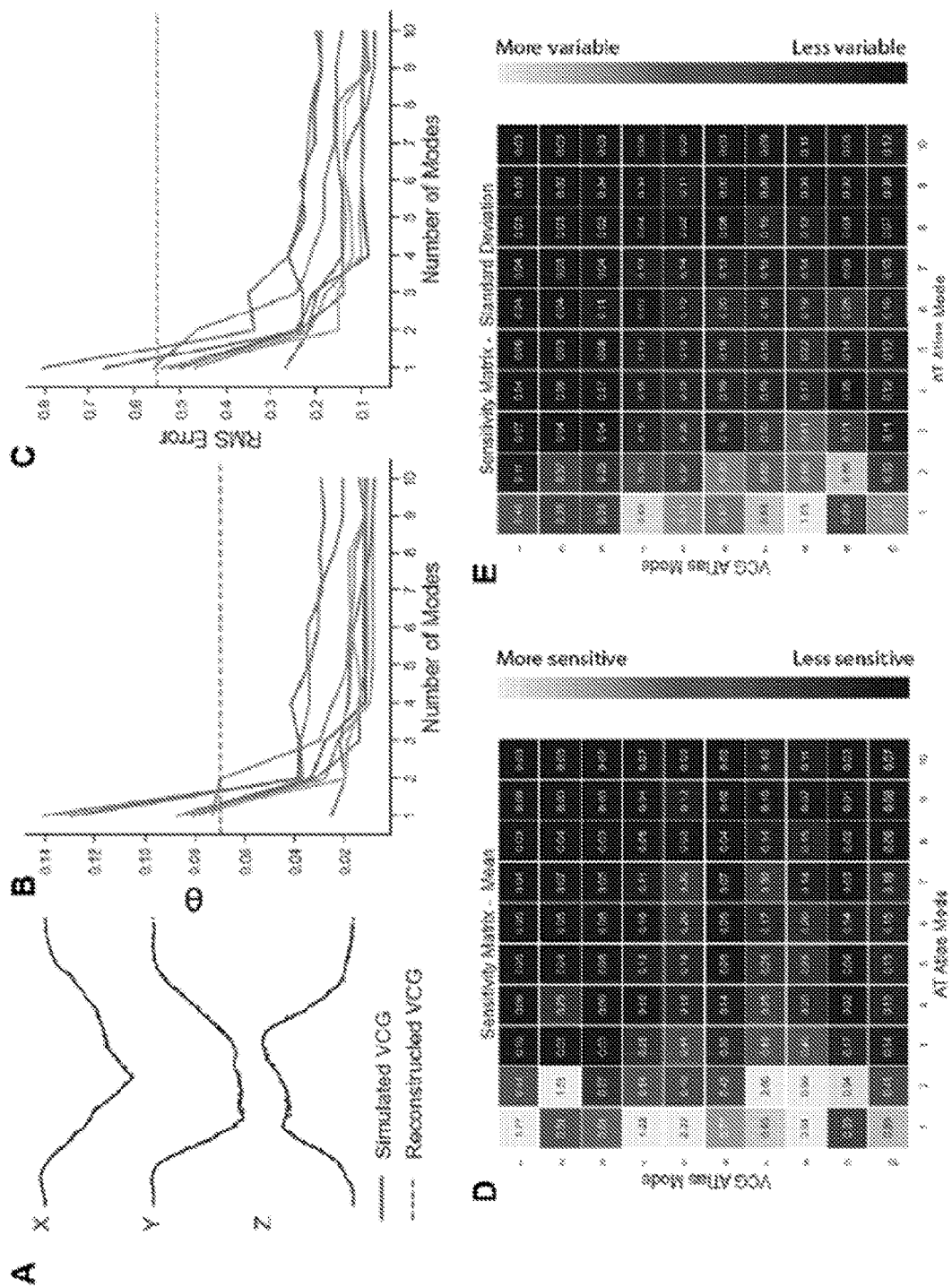
FIG. 6 depicts a covariation between an activation time (AT) atlas modes and a vectorcardiogram (VCG) atlas modes, in accordance with some example embodiments.

Given that the activation time (AT) atlas and the vectorcardiogram (VCG) atlas are derived from the same set of simulations, interactions exist between the principal modes of variation in the atlases of the two modalities. To enable a direct, quantitative comparison between the atlases, vectorcardiograms (VCGs) were a quantitative comparison between the atlases requires vectorcardiograms generated from an activation map. To determine if activation maps are sufficient to faithfully recalculate the vectorcardiogram (VCG), a complete voltage solution at each node in the finite element mesh may be regenerated by shifting a single action potential waveform according to the activation time. As shown in FIG. 6A, the vectorcardiogram (VCG) recalculated using this artificial voltage solution is nearly imperceptibly different from the original simulated vectorcardiogram. Repeating this for optimal simulations for each of the eight patients, the average error between the original and reconstructed vectorcardiogram (VCG) was θ=0.004±0.001 radians and RMS error=0.05±0.02 mV.

The same approach may also be used to determine the efficiency of dimensionality reduction using the activation tine atlas by computing how many modes of the activation time (AT) atlas are required to faithfully reconstruct the vectorcardiogram (VCG). FIGS. 6B-C demonstrate that the error between the simulated vectorcardiogram (VCG) and the vectorcardiogram reconstructed from the activation maps decreases rapidly and the reconstructed vectorcardiogram is highly accurate with as few as four modes of the activation time (AT) atlas.

To assess the covariation of the activation time (AT) atlas modes with the vectorcardiogram (VCG) atlas modes, the Jacobian matrix was calculated by reconstructing vectorcardiograms from the activation maps corresponding to the 35$^{th}$ and 65$^{th}$ percentile for each of the first 10 modes of the activation time (AT) atlas, resolving those vectorcardiograms against the vectorcardiogram (VCG) atlas, and subtracting the resulting percentiles for each vectorcardiogram atlas mode. This computation requires a patient-specific geometry and thus a sensitivity matrix was calculated for all eight geometries. The resulting mean sensitivity matrix is visualized as a heatmap in FIG. 6D, and the standard deviation of the sensitivity matrix across different meshes is show in FIG. 6E.

To determine if a reconstructed vectorcardiogram (VCG) derived from a small number of modes of the activation time (AT) atlas can match the clinical vectorcardiogram without running any additional finite element simulations, a proof-of-concept grid search of the first 4 modes of the activation time (AT) atlas was performed. The optimal matching vectorcardiogram (VCG) reconstructed with just four modes of the activation time (AT) atlas without running additional finite element simulations had an average error θ=0.080±0.029 radians and RMS error=0.52±0.15 mV. Errors for the original optimization that required running the finite element simulations were θ=0.070±0.028 radians and RMS error=0.55±0.15 mV.

Referring again to FIG. 1, in some example embodiments, the assessment engine 110 may apply a dimensionality reduction technique to derive the one or more activation atlases 125 (e.g., of activation maps and vectorcardiograms) from one or more electrophysiology simulations with variations in ventricular geometry and pacing location. The one or more activation atlases 125 may include an activation time (AT) atlas and a vectorcardiogram (VCG) atlas. Furthermore, the one or more activation atlases 125 demonstrate efficient dimensionality reduction of the underlying data. For example, he activation time (AT) atlas provided significant dimensionality reduction for the activation maps by reducing an input vector of 10,706 features values down to 10 modes while still accounting for 98% of the variation. Similarly, the vectorcardiogram (VCG) atlas efficiently reduced an input vector of 300 values to 10 modes while accounting for 97% of the variance. Examples of dimensionality reduction techniques include principal component analysis (PCA), random projection, robust principal component analysis (RPCA), t-distributed stochastic neighbor embedding (t-SNE), a uniform manifold approximation and projection (UMAP), Fourier series, and linear discriminant analysis. The one or more activation atlases 125 may be used to reconstruct patient-specific clinical measurements such as electrocardiograms (ECG) and 3-dimensional activation patterns without the need for new simulations.

The first three principal modes for the two atlases describe the same general variation with similar fractions of variance explained. Mode 1 in the activation time (AT) atlas describes variation between an early activation on the anterior wall of the heart (negative Z) and the posterior wall (positive Z). This is consistent with the root-mean-square (RMS) error computed on the vectorcardiogram (VCG) atlas shown in FIG. 4E. Similarly, both atlases show variation in the apical/basal (positive/negative X) direction for mode 2 and right ventricle/left ventricle (RV/LV) (positive/negative Y) for mode 3. Those three modes account for 91% and 86% of the variation in the underlying data for the activation time (AT) atlas and vectorcardiogram (VCG) atlas, respectively. Interestingly, the distributions of the feature values in principal component space for those three modes are not similar. In the activation time (AT) atlas, the modes appear nearly uniformly distributed (modes 1 & 2) or highly skewed (mode 3), whereas the distribution of the feature values in the vectorcardiogram (VCG) atlas appear more bell-shaped.

For both atlases, errors associated with the dimensionality reduction were less than the mean approximation error between the clinical vectorcardiogram (VCG) and the optimal simulated vectorcardiogram (VCG) for the patients in the original study on which the simulations were based. Specifically, clinical vectorcardiograms (VCGs) reconstructed using the first eight modes of the vectorcardiogram (VCG) atlas and vectorcardiograms calculated from activation maps having four activation time (AT) atlas modes all fell below this error threshold.

Vectorcardiograms recalculated from monodomain simulation-derived activation maps by assuming a constant action potential waveform differed negligibly from the original simulated vectorcardiogram. Furthermore, using the activation time (AT) atlas, a faithful recalculated vectorcardiogram (VCG) could be reconstructed using less than five modes. This was a particularly useful feature of the activation time (AT) atlas, as resolving vectorcardiograms calculated this way into vectorcardiogram atlas modes, a compact Jacobian quantified the sensitivity of model-derived vectorcardiogram (VCG) atlas modes to activation time atlas modes. The Jacobian shows that some of the activation atlas modes (e.g., activation time atlas modes 6 and 8-10) have minimal impact on the vectorcardiogram (VCG) atlas mode percentiles, and some of the vectorcardiogram atlas modes are insensitive by changes in the first ten activation time (AT) atlas modes (e.g. vectorcardiogram atlas mode 6).

The ability to establish a direct link between the activation time (AT) atlas and the vectorcardiogram (VCG) atlas may be exploited to generate estimates of patient-specific ventricular activation patterns from non-invasive clinical data. Since paired activation maps and vectorcardiograms can be generated without running additional finite element simulations, the assessment engine 110 may perform a simple grid search (as performed here) or a more complex optimization more efficiently to match a patient-specific vectorcardiogram (VCG) and derive a corresponding activation map. Inversion of the Jacobian matrix may also allow more rapid conversion from a small number of vectorcardiogram (VCG) atlas modes from a clinical vectorcardiogram (VCG) to an approximated activation map.

Accordingly, various dimensionality reduction techniques can be used to derive atlases that greatly reduce the dimensionality of model-predicted three-dimensional biventricular activation times and corresponding vectorcardiograms, and permit an accurate and efficient mapping between them to be derived. This could provide an efficient way to estimate biventricular activation times from noninvasive surface electrocardiograms and anatomic scans, shedding light on arrhythmia substrates, resynchronization interventions, and pacing-mediated myocardial dysfunction.

Figure 8:
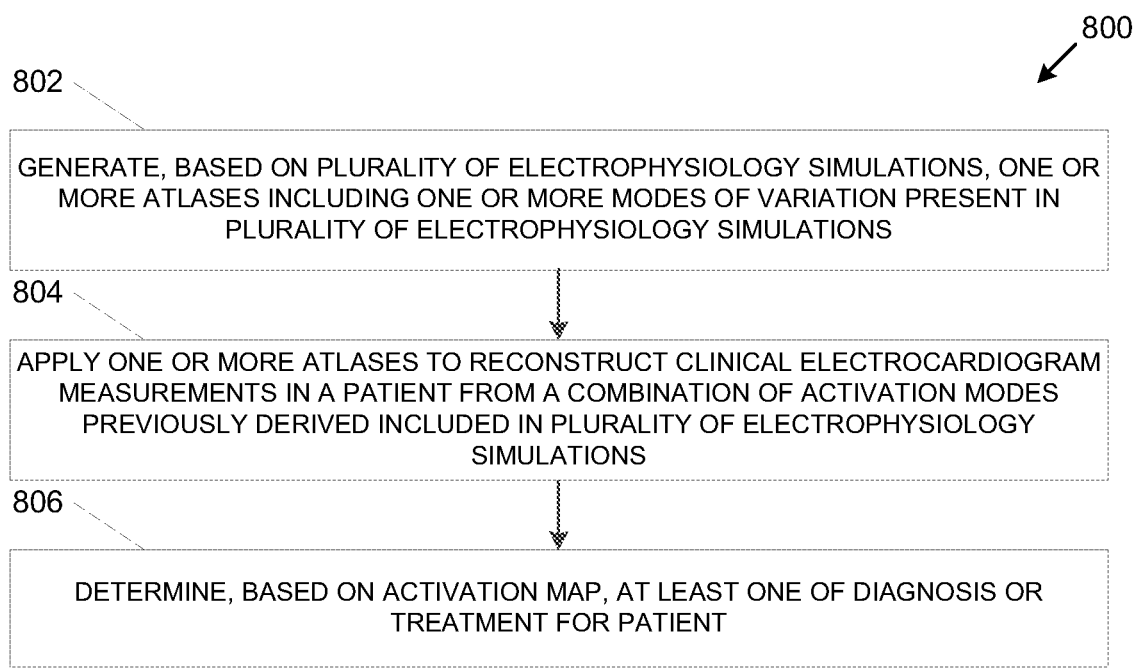
FIG. 8 depicts a flowchart illustrating an example of a process for atlas-based characterization of patient-specific cardiac electromechanical activation maps, in accordance with some example embodiments.

FIG. 8 depicts a flowchart illustrating an example of a process 800 for atlas-based characterization of patient-specific cardiac electromechanical activation maps, in accordance with some example embodiments. Referring to FIGS. 1 and 8, the process 800 may be performed by the assessment engine 110 in order to generate and apply one or more atlases electrophysiological and/or electromechanical simulations.

At 802, the assessment engine 110 may generate, based on a plurality of electrophysiology simulations, one or more atlases including one or more modes of variation present in the plurality of electrophysiology simulations. In some example embodiments, the assessment engine 110 may generate, based on a training set of cardiac electrophysiological and/or biomechanical simulations, one or more atlases by applying a dimensionality reduction technique such as principle component analysis (PCA), random projection, robust principal component analysis (RPCA), t-distributed stochastic neighbor embedding (t-SNE), a uniform manifold approximation and projection (UMAP), Fourier series, linear discriminant analysis, and/or the like. For example, the assessment engine 110 may generate an activation time (AT) atlas and a vectorcardiogram (VCG) atlas, each of which including one or more modes that account for the variations that are present in the training set of cardiac electrophysiological and/or biomechanical simulations. In each atlas, the first mode may account for the most variance, the second mode may account for the next most variance, and so on. For instance, mode 1 in the activation time (AT) atlas describes variation between an early activation on the anterior wall of the heart (negative Z) and the posterior wall (positive Z). Meanwhile, mode 2 in the two atlases account for variations in the apical/basal (positive/negative X) direction while mode 3 in the two atlases account for variations in the right ventricle and left ventricle (RV/LV) (positive/negative Y).

At 804, the assessment engine 110 may apply one or more atlases to reconstruct clinical electrocardiogram measurements in a patient from a combination of activation modes previously included in a plurality of electrophysiology simulations. In some example embodiments, the assessment engine 110 may apply the one or more atlases to match a clinical vectorcardiogram of a patient to a simulated vectorcardiogram associated with an activation map included in the plurality of electrophysiology simulations. An accurate patient-specific electrical and/or mechanical activation map may be obtained by identifying a simulated electrical and/or mechanical activation map whose simulated vectorcardiogram (VCG) matches the patient's clinical vectorcardiogram (VCG). However, an optimal match requires executing numerous computationally expensive finite element simulations to identify the early pacing sites and conductivity properties. As such, the match may be identified by comparing reduced dimension representations of the patient's clinical vectorcardiogram and simulated vectorcardiograms, each of which including one or more modes accounting for the variations present in each vectorcardiogram.

At 806, the assessment engine 110 may determine, based at least on the activation map, at least one of a diagnosis or a treatment for the patient. In some example embodiments, the diagnosis and treatment of cardiac conditions, such as cardiac arrhythmias, may be performed based on the patient's electrical and/or mechanical activation maps. For example, the patient's electrical and/or mechanical activation maps may be used to localize one or more sources of arrhythmia. Ablation is one example treatment for cardiac arrhythmias in which radiofrequency, cryogenic temperatures, ultrasound, and/or radiation (e.g. stereotactic ablative radiotherapy (SAbR)) may be applied to the source of the cardiac arrhythmia to create lesions that disrupts the erratic electric signals causing the abnormal heart activation. The outcome of ablation may improve significantly when the location of the source of the arrhythmia is correctly identified based on patient-specific electrical and/or mechanical activation maps.

Figure 9:
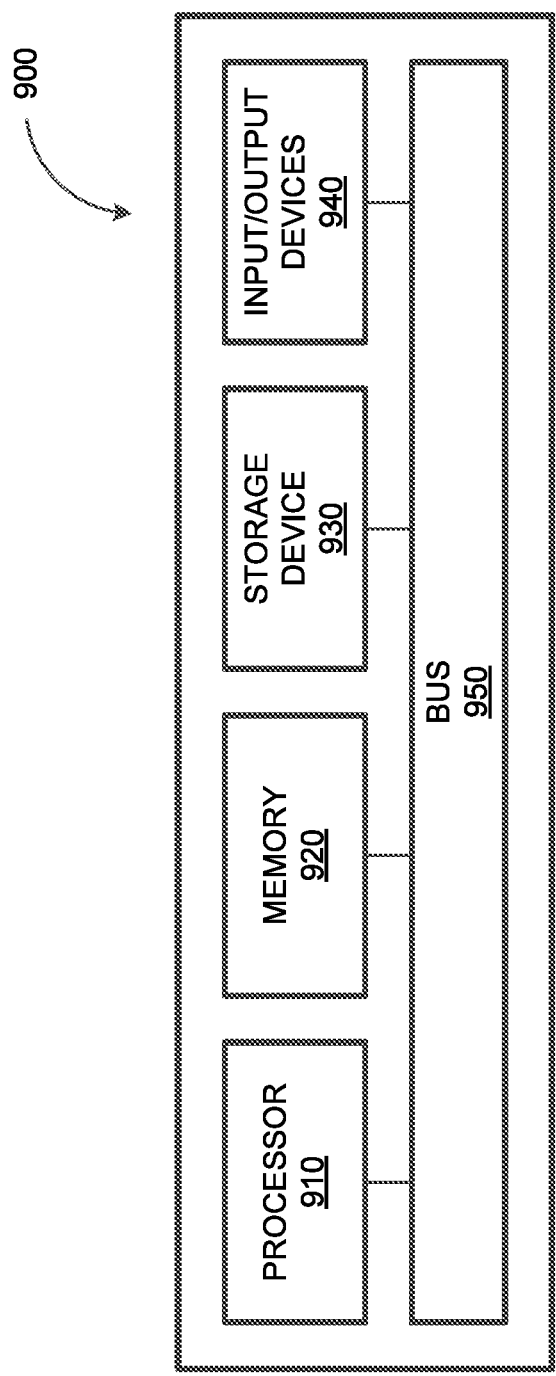
FIG. 9 depicts a block diagram illustrating a computing system, in accordance with some example embodiments.

FIG. 9 depicts a block diagram illustrating a computing system 900, in accordance with some example embodiments. Referring to FIGS. 1 and 9, the computing system 900 can be used to implement the assessment engine 110 and/or any components therein.

As shown in FIG. 9, the computing system 900 can include a processor 910, a memory 920, a storage device 930, and an input/output device 940. The processor 910, the memory 920, the storage device 930, and the input/output device 940 can be interconnected via a system bus 950. The processor 910 is capable of processing instructions for execution within the computing system 900. Such executed instructions can implement one or more components of, for example, the assessment engine 110. In some implementations of the current subject matter, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, or a tape device, or other suitable persistent storage means. The input/output device 940 provides input/output operations for the computing system 900. In some implementations of the current subject matter, the input/output device 940 includes a keyboard and/or pointing device. In various implementations, the input/output device 940 includes a display unit for displaying graphical user interfaces.

According to some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some implementations of the current subject matter, the computing system 900 can be used to execute various interactive computer software applications that can be used for organization, analysis and/or storage of data in various (e.g., tabular) format. Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, and/or the like. The applications can include various add-in functionalities or can be standalone computing products and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random-access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one processor; and
   at least one memory including program code which when executed by the at least one processor provides operations comprising:
      generating, based at least on a plurality of electrophysiology simulations, one or more atlases by at least applying a dimensionality reduction technique, the one or more atlases including an activation time atlas and a vectorcardiogram atlas, the one or more atlases further including one or more modes that capture variation present in the plurality of electrophysiology simulations, wherein the one or more modes of variation include a first mode associated with variations between an early activation on an anterior wall of a heart and a posterior wall of the heart, a second mode associated with variations in an apical and/or basal direction of the heart, and a third mode associated with variations in a right ventricle and left ventricle of the heart;
      applying the one or more atlases to match a clinical vectorcardiogram of a patient to a simulated vectorcardiogram associated with an activation map included in the plurality of electrophysiology simulations; and
      determining, based at least on the activation map, at least one of a diagnosis or treatment for the patient.

2. The system of claim 1, wherein the one or more modes are determined by applying the dimensionality reduction technique.

3. The system of claim 2, wherein the determination of the one or more modes provides a ranked list of orthogonal modes that capture the variation in nodal activation times and vectorcardiogram waveforms across the electrophysiology simulations.

4. The system of claim 1, wherein the dimensionality reduction technique includes one or more of principal component analysis (PCA), random projection, robust principal component analysis (RPCA), t-distributed stochastic neighbor embedding (t-SNE), a uniform manifold approximation and projection (UMAP), Fourier series, and linear discriminant analysis.

5. The system of claim 1, wherein the one or more modes of variation includes the first mode and the second mode, and wherein the first mode is associated with a first quantity of variations that is greater than a second quantity of variations associated with the second mode.

6. The system of claim 5, wherein the one or more modes of variation further includes the third mode associated with a third quantity of variations, and wherein the second quantity of variations associated with the second mode is greater than the third quantity of variations associated with the third mode.

7. The system of claim 1, wherein the diagnosis includes identifying a location of a source of a cardiac arrhythmia associated with the patient.

8. The system of claim 1, wherein the treatment includes a catheter ablation and/or a stereotactic ablative radiotherapy (SAbR).

9. The system of claim 1, wherein the plurality of electrophysiology simulations include one or more electrical activation maps, biomechanical activation maps, and/or electromechanical activation maps.

10. The system of claim 1, wherein the one or more atlases are applied to generate a reduced dimension representation of the clinical vectorcardiogram, and wherein the reduced dimension representation of the clinical vectorcardiogram is compared to a plurality of reduced dimension representations of simulated vectorcardiograms to match the clinical vectorcardiogram of the patient to the simulated vectorcardiogram associated with the activation map.

11. The system of claim 1, wherein the operations further comprise:
    generating the plurality of electrophysiological simulations to correspond to a variety of cardiac geometries, cardiac orientations, scar configurations, degrees of cardiac fibrosis and scar, depolarization patterns, and/or activation types.

12. The system of claim 11, wherein the operations further comprise:
    generating, for each electrophysiological simulation included in the plurality of electrophysiological simulations, one or more corresponding simulated vectorcardiograms.

13. The system of claim 1, wherein the clinical vectorcardiogram is generated by applying a transformation to convert an output of a 12-lead electrocardiogram (ECG).

14. The system of claim 1, wherein each of the one or more atlases includes between 3 to 50 modes of variation.

15. The system of claim 1, wherein the one or more atlases include a sufficient quantity of modes to cover a threshold quantity of variations present in the plurality of electrophysiological simulations.

16. The system of claim 1, wherein an error between the clinical vectorcardiogram and a reconstruction of the clinical vectorcardiogram generated based on the one or more atlases is below a threshold value.

17. The system of claim 16, wherein the error corresponds to a quantity of modes included in the one or more atlases.

18. The system of claim 1, wherein the operations further comprise:
   applying the one or more atlases to reconstruct an activation pattern associated with the patient.

19. The system of claim 18, wherein the operations further comprise:
   generating, based at least on the reconstructed activation pattern, one or more electrocardiograms (ECG) or vectorcardiograms for the patient without performing additional electrophysiology simulations.

* * * * *